Oct. 19, 1965       E. N. MARTIN ETAL       3,212,757
MIXING AND AERATING APPARATUS
Filed Jan. 7, 1963
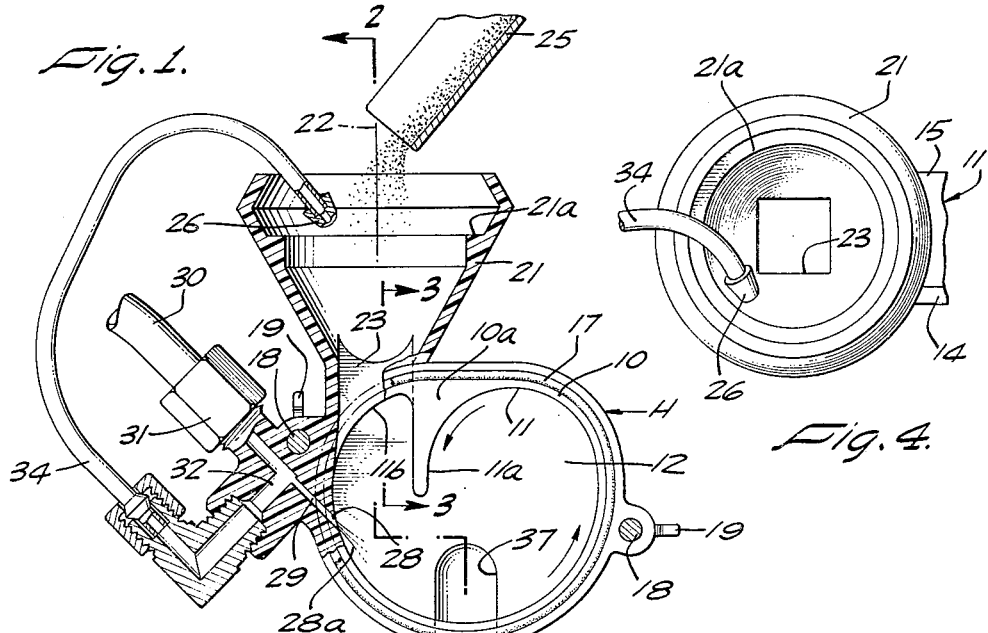
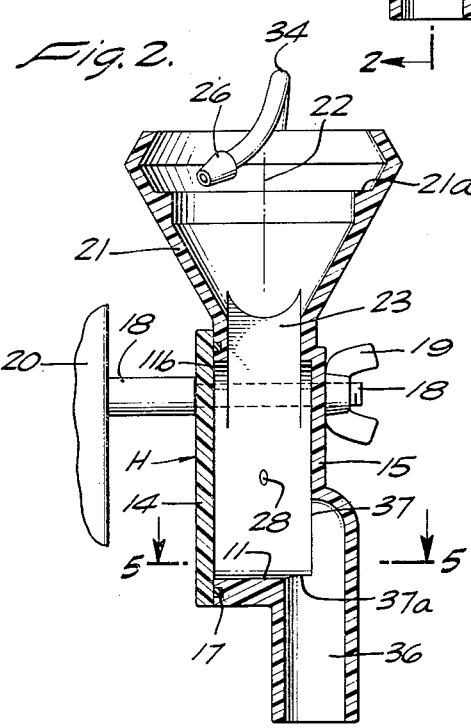
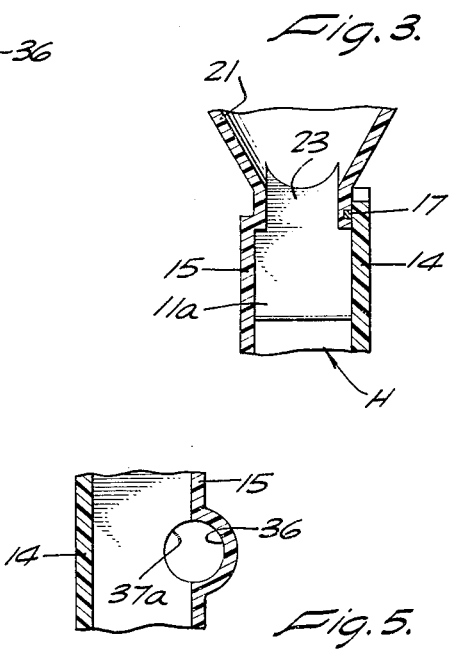
INVENTORS.
ERNEST NEWELL MARTIN,
DARWIN B. MAXSON,
BY
Paul A. Weilein
ATTORNEY United States Patent Office 3,212,757
Patented Oct. 19, 1965

3,212,757
MIXING AND AERATING APPARATUS
Ernest Newell Martin, 1141 High St., Escondido, Calif., and Darwin B. Maxson, 7126 Rio Flora Place, Downey, Calif.
Filed Jan. 7, 1963, Ser. No. 249,695
18 Claims. (Cl. 259—4)

The present invention relates generally to a device for mixing and aerating liquids, and more particularly to such a device that may be used to mix and aerate liquid or soluble food products in a dispensing machine or the like.

It is generally recognized that it is desirable to thoroughly mix and aerate many food items in order to improve their taste or appearance. It is generally true that most food products are improved in taste, if not also in appearance, by aeration. Many familiar examples are ice cream, malted milk drinks, whipped cream, as well as common drinks such as hot chocolate.

With this in mind, it has been a general object of the invention to devise apparatus for mixing and aerating liquids that are food products, although it will be realized that in a broad sense the invention is not limited to any particular product or liquids and may be used equally well in the mixing and aeration of non-food items.

For use with food products, it is desirable that a mixer of this character be self-cleaning in operation so that all the food products are washed out during each operating cycle and in the periods of non-use no foodstuffs remain to spoil.

It is also desirable that such a mixing device be completely reliable in operation and therefore be free of moving parts which are in any manner subject to failure or malfunction. Such a device has the advantage of requiring a minimum of maintenance while giving maximum assurance of functioning readily at all times.

Any device used to handle or process foodstuffs should be easy to assemble and disassemble, easy to clean, and capable of a certain range of adjustment in order to handle different products or to obtain different degrees of mixing and aeration.

Thus, it is a general object of the invention to produce a mixing and aerating device having all the above advantageous characteristics in a novel structure which is simple to design and therefore of low cost in production.

These objects are obtained in a device for mixing two or more liquids or combinations of liquids and powders, typically including a liquid product which is prepared in the device by dissolving or suspending powder in liquid such as water, comprising a housing having an interior mixing chamber provided with an arcuate wall with a surface of volute configuration, inlet means for introducing into said chamber a quantity of a product to be mixed, jet means introducing into the mixing chamber a stream of a liquid in a direction to create within the chamber a vortex of said liquid and product thereby mixing and aerating the liquid and product, and outlet means for withdrawing from the chamber the aerated mixture.

How the above objects of the invention are attained will be more readily understood by reference to the following description and to the annexed drawing, in which:

FIG. 1 is a combined vertical section and elevation of a mixing and aerating device constructed acccording to the present invention as it appears with one of the side walls of the mixing chamber removed.

FIG. 2 is a vertical transverse section on line 2—2 of FIG. 1;

FIG. 3 is a fragmentary vertical section on line 3—3 of FIG. 1;

FIG. 4 is a top plan of the hopper; and

FIG. 5 is a fragmentary section on line 5—5 of FIG. 2.

Referring now to the drawing, and especially to FIG. 1, there is shown a preferred embodiment of the invention which comprises a housing indicated generally at H having a wall 10 with an inner arcuate surface 11 of volute configuration which forms the periphery of the internal mixing chamber 12. The arcuate surface gives to the periphery of chamber 12 a generally volute configuration although it is not necessary that the surface of the wall 10 be a geometrically correct spiral. Broadly speaking, the arcuate surface 11 is characterized by a change in radius of curvature with the minimum radius at one end 11a and the maximum radius at the other or inlet end 11b, the intervening change in radius occurring progressively or in steps. The curvature is in a single plane, which may be vertical or horizontal, and elements of the arcuate surface perpendicular to that plane are preferably straight lines as may be seen in FIG. 2. Because of the changing radius of curvature of the surface of wall 10, the two ends at 11a and 11b are spaced apart radially.

In the preferred embodiment illustrated in FIG. 1, it is desired that the major parts of the mixer be arranged in a generally vertical relationship with respect to each other so that the wall 10 is curved in a vertical plane. The wall will be seen in FIG. 1 to extend for substantially 360°, or one full turn, about a centrally disposed horizontal axis perpendicular to the plane of the drawing.

Mixing chamber 12 is bounded by a pair of flat, parallel side walls 14 and 15, side wall 14 being removable to provide access to the mixing chamber for cleaning if necessary. Side walls 14 and 15 preferably, but not necessarily, have substantially flat inner faces. Gasket 17 engages the inner face of wall 14 to provide a liquid-tight seal between it and wall 10 of the housing. Side wall 14 is held in place by a pair of bolts 18 having wing nuts 19 which can be tightened or removed manually, thus eliminating the need of any tools for disassembling the mixer.

Bolts 18 may also be employed to support the mixer from any suitable member, as shown in FIG. 2, by attaching one end of bolt 18 to supporting structure 20.

Inlet means are provided for introducing into mixing chamber 12 a quantity of a product to be mixed with liquid. Such inlet means includes a hopper or funnel 21, preferably having a conically shaped internal surface and disposed with its axis 22 vertical. The bottom of hopper 21 communicates with mixing chamber 12 through inlet orifice 23 which is located at one side of the mixing chamber adjacent end wall 11b of surface 11, to direct material entering the mixing chamber substantially tangential of arcuate surface 11. Flow from the hopper into the mixing chamber is by gravity.

For purposes of illustration, it is assumed that the product to be introduced into the mixer is a food product in the form of dry powder, for example, cocoa or chocolate, and that a measured quantity of this product is introduced into the open upper end of hopper 21 by means of spout 25 or any other suitable means. The inlet means includes means, such as water nozzle 26, designed to direct a stream of water more or less tangentially over the interior conical surface of hopper 21 to dissolve the powder, partly or entirely, or at least to carry it in suspension in the water as the water flows by gravity through inlet orifice 23 into mixing chamber 22. Hopper 21 may have one or more internal annular shoulders 21a which slow the downward movement of the water and retain it in the hopper longer to effect greater dissolution of the powder.

Thus, hopper 21 provides a pre-mixing chamber in which a charge of a dry powder may be mixed with liquid so that the product entering chamber 12 is in liquid form.

The preferred embodiment of the present invention has been designed especially for the preparation of beverages from easily soluble dry powdered products, such as coffee, tea, milk, cocoa and the like. However, it will be realized that the product entering hopper 21 may be a liquid, for example, a syrup or a liquid concentrate. Under these circumstances, it may be desired to use the water jet 26 in order to wash all of the material into the mixing chamber from the hopper, but it is within the scope of the invention to inject solid or liquid products into the mixing chamber directly through inlet orifice 23 without contact with hopper 21.

The product entering chamber 12 through inlet 23, normally a liquid, strikes a stream of liquid entering mixing chamber 12 through port 28, this second stream of liquid entering at relatively high velocity in order to carry the two liquids around and around within the mixing chamber, thus creating a vortex of the two liquids which thoroughly mixes and aerates them. Air is introduced into the liquid by the injection action of the stream entering through port 28 which entrains air and carries it into the vortex. Air entering the mixing chamber through inlet 23 is available for this purpose. Another source of air usually available is the air dissolved in the water entering at port 28. The lower pressure in the high velocity jet at 28a releases dissolved air. A third source of air may, in some cases, be the dry powdered food product itself.

The stream of liquid entering at port 28 flows through suitable jet means which includes passage 29 that communicates with a suitable source of water through a hose or tubing 30. The tubing is connected to a mixer housing by any suitable type of coupling 31. Passage 29 preferably is provided with a branch 32 which is connected by tubing 34 with nozzle 26. Thus, both liquids issuing at port 28 and nozzle 26 are derived from a common source. This is the usual arrangement in making beverages, since it is desired to dissolve the powdered product in hot water. However, it will be understood that it is within the scope of the present invention to connect nozzle 26 and passage 28 to different sources of liquids, as might be done in the event that it was desired to inject two different liquids into the mixing chamber.

Passage 29 is so positioned as to direct the stream of liquid entering through port 28 in a direction generally tangential to and over the length of the arcuate wall surface. The jet, being downstream from inlet 23, intercepts the entering product. The force of the jet carries the liquid from the jet and the product entering through inlet port 23 upwardly along wall 11 toward the portion of the smaller radius of curvature. At the end 11a of the wall the material is directed downwardly to be again picked up and carried around the arcuate wall by the force of the liquid stream entering through port 28. Centrifugal force causes the liquid to be distributed in a layer over arcuate surface 11. Some of the liquid may make several circuits in a closed path within chamber 12 before being discharged from the chamber.

When the layer of liquid moving over arcuate surface 11 leaves the end of surface 11a, it is initially directed downwardly, assuming the device to be positioned as in FIG. 1, but some of the liquid may retain more or less of the radial component of the swirling motion. The result of this radial component is to deflect the liquid, now a freely falling sheet or curtain, toward jet 28a. This deflection increases in amount as the liquid layer increases in thickness. The jet 28a of water or other liquid from port 28 pierces this curtain of falling liquid, creating turbulence that entrains air as well as thoroughly mixing the liquids. The force of the jet then carries the mixture along wall 10 for another circuit of the mixing chamber.

It will be noted that housing wall 10 has an inward extension 10a that not only provides the portion of surface 11 of minimum curvature at 11a, but also is a partition that on one side separates the vortex from the incoming product at inlet 23. On the other side of extension 10a the incoming product is directed thereby toward the jet at port 28 and is carried by the jet into the vortex in a generally tangential direction relative to the vortex.

As the liquid swirls around within chamber 12, some liquid is being withdrawn through outlet means provided in the form of duct 36 which opens to mixing chamber 12 at discharge port 37 at the lower portion of the chamber. Port 37 lies partly within side wall 15, but may, and preferably does, extend for a short distance into arcuate wall 11 as at 37a in FIGS. 2 and 5. Fluid flow through the portion of port 37 in the side wall 15 is chiefly by gravity, but through the portion of port 37 in the peripheral wall of the chamber, fluid flow is largely caused by centrifugal force. Since port 37 is at one side of the chamber, viewed as in FIG. 2, and is also eccentric with respect to port 28 and jet 28a, there is a laterally directed flow of some or most of the liquid across the chamber to reach the discharge port. This arrangement of the port results in a portion of the mixed liquids being drawn off gradually through outlet duct 36 during most of the period of mixing and as additional material is being introduced into the chamber. The build-up of liquid and retention time within the mixing chamber as well as the rate of discharge through duct 36 can be controlled by the size of discharge port 37 and by the distribution of the total area of the port between side wall 15 and peripheral wall 10.

Another advantage of the placement of port 37 is that the area of duct 36 can be made as large as necessary to reduce the velocity of flow in the duct to a desired value without necessarily reducing the total area of port 37 below a desired value. A further advantage is that there is a direct gravity flow through the entire mixing device from top to bottom without any hindrance, thus promoting fluid flow and the self-cleaning characteristics of the device.

While specific structural details have been shown and described, it should be understood that changes and alterations may be resorted to without departing from the spirit of the invention as defined in the appended claims.

I claim:

1. A mixing device of the character described, comprising: a housing enclosing an interior mixing chamber having one wall formed with an arcuate surface of substantially 360° in extent and of generally volute configuration; inlet means for introducing into said chamber a quantity of a product; jet means introducing into said chamber a stream of a liquid in a direction to create within the mixing chamber a vortex of said liquid and product moving over said arcuate wall for mixing the liquid and product; and outlet means at one side of the median plane of the arcuate surface for withdrawing from the chamber the resulting mixture of said liquid and product.

2. A mixing device as in claim 1 in which the jet means directs the stream of liquid generally tangential to the arcuate surface.

3. A mixing device of the character described comprising: a housing enclosing an interior mixing chamber having one wall formed with an arcuate surface of substantially 360° in extent and of generally volute configuration; inlet means for introducing into said chamber a quantity of a product; jet means located downstream from the inlet means at a position to intercept entering product for introducing into said chamber in a direction generally tangential to the arcuate surface a stream of liquid to create within the mixing chamber a vortex of said liquid and product moving over said arcuate wall for mixing the liquid and product; and outlet means for withdrawing from the chamber the resulting mixture of said liquid and product.

4. A mixing device as in claim 1 in which the outlet means includes a port located in a wall at one side of said arcuate surface.

5. A mixing device of the character described, comprising: a housing enclosing an exterior mixing chamber having one wall formed with an arcuate surface of generally volute configuration; inlet means for introducing into said chamber a quantity of a product; jet means introducing into said chamber a stream of a liquid in a direction to create within the mixing chamber a vortex of said liquid and product moving over said arcuate wall for mixing the liquid and product; outlet means for withdrawing from the chamber the resulting mixture of said liquid and product; and a partition provided by said one wall between said inlet means and one end of said arcuate surface.

6. A mixing device as in claim 1 which includes means at one end of the arcuate surface directing the incoming product to intercept the vortex with a tangential relationship.

7. A mixing device as in claim 1 in which the arcuate surface is of greater radius of curvature at one end than at the other end and the inlet means is located between said two ends of the arcuate surface.

8. A mixing device as in claim 3 in which the inlet means includes a conical hopper adapted to receive a product in dry powdered form and means directing a stream of water over the inner surface of the hopper to effect mixing of the product and water prior to entering the mixing chamber.

9. A mixing device as defined in claim 8 in which the axis of the hopper is substantially vertical and the water flows by gravity therefrom into the mixing chamber.

10. A mixing device of the character described, comprising: a housing enclosing an interior mixing chamber having one wall formed with an arcuate surface of generally volute configuration in one plane; said arcuate surface having an extent of substantially 360° about an axis perpendicular to said plane; elements of said surface perpendicular to said plane being substantially straight lines; inlet means for introducing into said chamber a quantity of a product at a position adjacent one end of the arcuate surface; jet means introducing into said chamber at a position of maximum radius of curvature of said surface a stream of liquid in a direction to flow over the length of said arcuate surface and create within the mixing chamber a vortex of said liquid and product for mixing the liquid and product; and outlet means at one side of the median plane of said arcuate surface for withdrawing from the chamber the resulting mixture of said liquid and product.

11. A mixing device of the character described, comprising: a housing enclosing an interior mixing chamber having one wall formed with an arcuate surface of generally volute configuration in one plane; elements of said surface perpendicular to said plane being substantially straight lines; inlet means for introducing into said chamber a quantity of a product at a position adjacent one end of the arcuate surface; jet means introducing into said chamber at a position of maximum radius of curvature of said surface a stream of liquid in a direction to flow over the length of said arcuate surface and create within the mixing chamber a vortex of said liquid and product for mixing the liquid and product; outlet means for withdrawing from the chamber the resulting mixture of said liquid and product; said housing including two generally flat substantially parallel walls disposed one on each side of the mixing chamber; and said outlet means including a port in one of said side walls.

12. A mixing device as in claim 10 in which the arcuate surface extends about a central horizontal axis, the ends of the arcuate wall being horizontally spaced to define a portion of the inlet means.

13. A mixing device of the character described, comprising: a housing enclosing an interior mixing chamber having one wall formed with an arcuate surface of generally volute configuration in one plane; elements of said surface perpendicular to said plane being substantially straight lines; inlet means for introducing into said chamber a quantity of a product at a position adjacent one end of the arcuate surface; jet means introducing into said chamber at a position of maximum radius of curvature of said surface a stream of liquid in a direction to flow over the length of said arcuate surface and create within the mixing chamber a vortex of said liquid and product for mixing the liquid and product; outlet means for withdrawing from the chamber the resulting mixture of said liquid and product; and a partition extending from said one wall and separating said inlet means from the end of the arcuate surface of minimum radius.

14. A mixing and aerating device of the character described, comprising: a housing enclosing an interior mixing chamber having one wall formed with an arcuate surface of generally volute configuration in a vertical plane between a pair of spaced, generally parallel side walls; inlet means for introducing into said chamber air and a quantity of product; said inlet means including a conical hopper adapted to receive a charge of dry material and a nozzle directing a stream of water over the inner surface of the hopper to dissolve the charge of dry material and carry said material into the mixing chamber; jet means introducing into said chamber near one end of the arcuate surface a stream of a liquid in a direction generally tangential of the arcuate surface to create within the mixing chamber a vortex of said liquid and product for mixing and aerating the liquid and product; and outlet means including a port in one of the side walls near the lower edge thereof for withdrawing from the chamber the mixture of said liquid and product.

15. A mixing and aerating device of the character described, comprising: a housing enclosing an interior mixing chamber having one wall formed with an arcuate surface of generally volute configuration; inlet means for introducing into said chamber air and a quantity of a product; said inlet means including a pre-mixing chamber and nozzle directing a stream of water to the pre-mixing chamber to be mixed therein with the product; jet means having a port in said one wall for introducing into said chamber a stream of water in a direction to create within the mixing chamber a vortex of said water and product for mixing and aerating the water and product; said jet means including a formation on the exterior of said one wall having an inlet and a passage leading from said inlet to said port; a conduit leading from said passage to said nozzle; and outlet means at one side of the median plane of said arcuate surface for withdrawing from the chamber the mixture of said water and product.

16. A mixing and aerating device of the character described, comprising: a housing enclosing an interior mixing chamber having one wall formed with an arcuate surface of substantially 360° in extent and of generally volute configuration; inlet means for introducing into said chamber air and a quantity of a product, said inlet means being located at one end of the arcuate surface to introduce said product in a direction to move along the length of the arcuate wall; means introducing a stream of water into the chamber including a passage terminating in a port in the arcuate surface directing said stream against the incoming product at a velocity sufficient to create within the chamber a vortex of said product and water moving over the full length of the arcuate surface; and outlet means at one side of the median plane of said arcuate surface for withdrawing from the chamber by gravity flow the mixture of product and water.

17. A mixing and aerating device of the character described, comprising: a housing enclosing an interior mixing chamber having one wall formed with an arcuate surface of generally volute configuration; inlet means for introducing into said chamber air and a quantity of a product; said inlet means being located at one end of the arcuate surface to introduce said product in a direction to move along the length of the arcuate wall; means introducing a stream of water into the chamber including a passage terminating in a port in the arcuate surface directing said stream against the incoming product at a velocity sufficient to create within the chamber a vortex of said product and water moving over the full length of the arcuate surface; and outlet means for withdrawing from the chamber by gravity flow the mixture of product and water; said outlet means including a duct opening to said mixing chamber at a port lying partly in the arcuate surface of said one wall and partly in a side wall adjoining said one wall.

18. A mixing device of the character described, comprising: a housing enclosing an interior mixing chamber having one wall formed with an arcuate surface of substantially 360° in extent and of generally volute configuration; inlet means for introducing into said chamber a quantity of a product; jet means introducing into said chamber a stream of a liquid in a direction to create within the mixing chamber a vortex of said liquid and product moving over said arcuate wall for mixing the liquid and product; and outlet means for withdrawing from the chamber the resulting mixture of said liquid and product.

References Cited by the Examiner

UNITED STATES PATENTS

| | | | |
|---|---|---|---|
| 366,820 | 7/87 | Donner. | |
| 659,278 | 10/00 | Argerbright | 295—95 |
| 1,382,992 | 6/21 | Lombard | 68—184 |
| 1,775,554 | 9/30 | Dehle | 68—184 |
| 2,137,300 | 11/38 | Allen | 259—4 X |
| 2,516,884 | 8/50 | Kyame | 259—36 X |

CHARLES A. WILLMUTH, *Primary Examiner.*